G. GENSCH.
RATTAN BASKETS AND APPARATUS FOR CONSTRUCTING THEM.
No. 184,237. Patented Nov. 14, 1876.
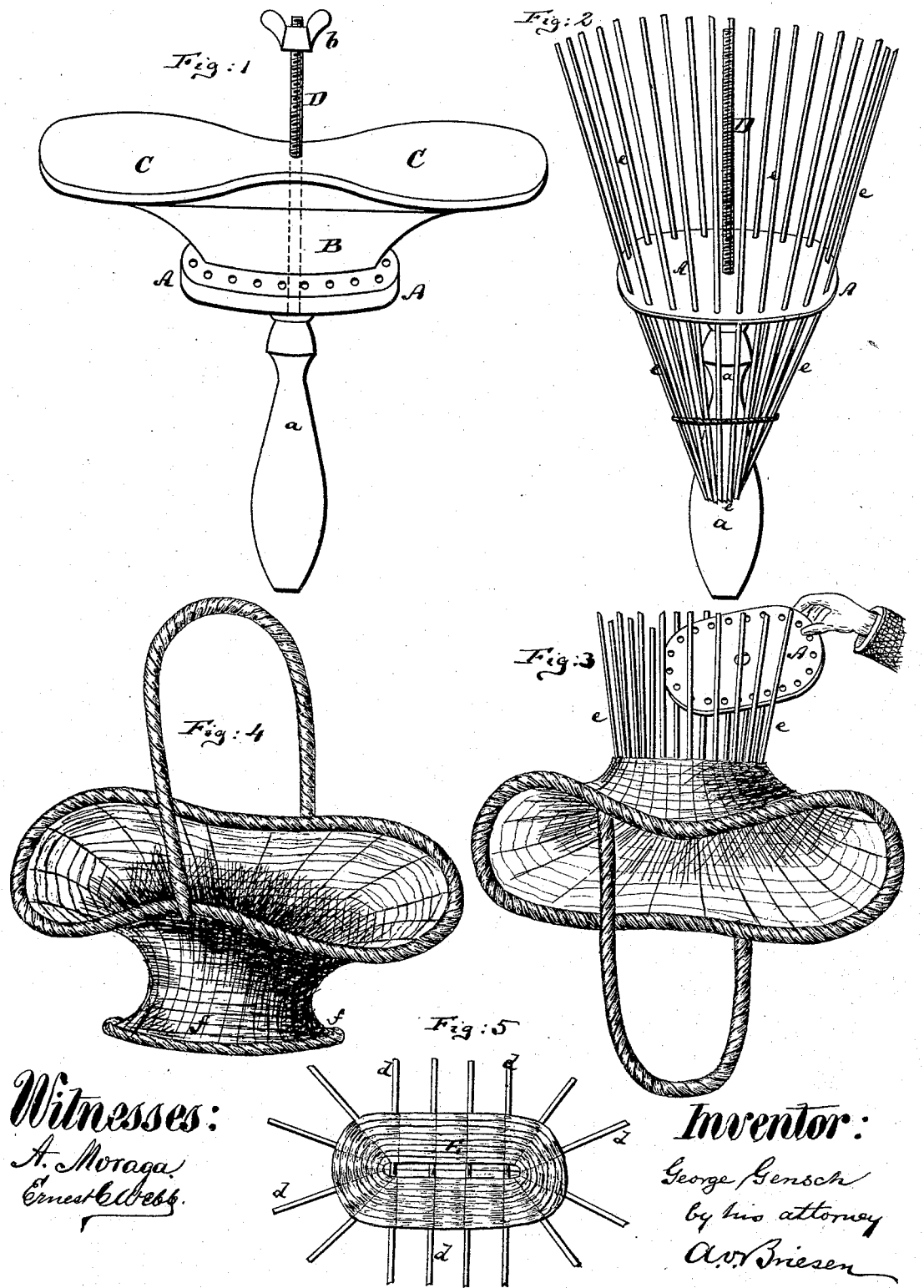

UNITED STATES PATENT OFFICE.

GEORGE GENSCH, OF NEW YORK, N. Y.

IMPROVEMENT IN RATTAN BASKETS AND APPARATUS FOR CONSTRUCTING THEM.

Specification forming part of Letters Patent No. 184,237, dated November 14, 1876; application filed March 6, 1876.

*To all whom it may concern:*

Be it known that I, GEORGE GENSCH, of New York city, in the county of New York, and State of New York, have invented a new and Improved Apparatus for, and Method of, Constructing Rattan Baskets, of which the following is a specification:

Figure 1 represents a perspective view of my improved apparatus for making rattan baskets. Fig. 2 is a perspective view of part of the same, showing the basket in the first stage of construction. Fig. 3 is a perspective view of a basket nearly finished. Fig. 4 is a perspective view of the complete basket. Fig. 5 is a plan view of the bottom of the basket, ready to be put in position.

Similar letters of reference indicate corresponding parts in all the figures.

This invention relates to a new manner of, and apparatus for, constructing rattan basket, having for its principal object to facilitate the making of the side and lower rim of the basket from continuous uprights, where, heretofore, the lower rim was usually separately made and tied to the side of the basket. By my invention a stronger basket and one of improved appearance is produced.

My invention consists, first, in the combination of a perforated bottom block or plate with the shaping blocks or cores of a basket-making apparatus, and also in the new manner, hereinafter described, of constructing a basket on my improved apparatus or its equivalent.

In the accompanying drawing, the letter A represents a board or plate of a size and shape to fit into the lower part of the basket to be made. B and C are the two or more pieces which constitute the shaping blocks or cores of the basket under process of construction. These blocks have substantially the shape and size of the interior of the basket to be made thereon. They may be made in one piece for many kinds of baskets. D is a rod, having a handle, *a*, at its lower end, and screw-threaded, by preference, at its upper end, to receive a thumb-nut, *b*. This rod can be inserted through central apertures in the parts A B C, as in Fig. 1, the thumb-nut serving to clamp the said parts properly together. The board A projects somewhat beyond the periphery of the lower block B, its projecting portion being perforated to receive the uprights of the proposed basket.

In the construction of the basket, the bottom E of the basket (shown in Fig. 5) is made separately, of the desired size and form; but the radial stays *d d* of rattan, used in such bottom, are allowed to project therefrom, so that they may be woven into the uprights or other parts of the side of the basket. This ready-made bottom may, in commencing the construction of the basket, be placed upon the board A and beneath the block B, being clamped between them by the nut *b*, the rod D passing through the center of such bottom; but, if desired, the bottom may be applied after the side of the basket has been completed, as hereinafter described.

After the parts A, B, C, and D have been properly united, or, if desired, even before, the upright pieces *e e* of rattan are inserted through the apertures of the board A, as in Fig. 2, so that their upper parts project above and their lower parts below said board. The side of the basket, or, as it may be termed, the "body," is now constructed on the form B C, by interweaving cross-pieces of rattan between the upper parts of the uprights, or such uprights may be interwoven among each other in suitable manner on such form. After the upper part of the basket-body has been thus completed and its upper edge finished, the forms B C may be removed and the plate A withdrawn therefrom, as indicated in Fig. 3, leaving the basket-body complete, but with the lower parts of the uprights projecting therefrom. In case the bottom E was clamped in between the parts A and B in manner stated, its radial projections *d d* are woven into the uprights *e e* before the withdrawal of the board A; but in case the bottom is not so applied at the first stage of construction, it may be applied to the basket after the removal of the board A, (indicated in Fig. 3,) and its radial projections *d d* thereupon interwoven with the uprights *e e*. After the upper body of the basket has been thus constructed and its bottom firmly applied, its lower rim or annular support *f* is constructed by weaving suitable cross-pieces into the projecting lower parts of the uprights *e e*, or by properly intertwining the lower projections of said uprights, thus completing the basket. The rim $f$ thus produced will support the bottom, as the radial arms $d\ d$ of the bottom rest upon the horizontal winding of said rim.

It will be seen that a basket thus constructed will have its uprights extend continuously from the lower to the upper edge, thus causing great strength, as compared with baskets on which the lower part $f$ is separately attached. On my improved apparatus, baskets, even such as have no lower projecting rims or supports $f$, can be more rapidly and more accurately made than by the means heretofore usually employed in the manufacture of such articles.

The edge of the board A may be merely notched instead of perforated, for the reception of the uprights of the basket; but in this case a cord or strap must be tied around the uprights in order to retain them in position.

I claim as my invention—

1. The combination of the perforated board A with the former or core B C and connecting-rod D, all arranged for use in the construction of baskets, substantially as specified.

2. In the art of making baskets, the perforated board A, for receiving the uprights $e\ e$, which project from the upper and lower faces of said board, substantially as specified.

3. As a new article of manufacture, a basket made from uprights $e\ e$, which extend from the upper to the lower edge thereof, and a bottom, E, which is attached by the radial arms $d\ d$ to such uprights at a distance above their lower ends, substantially as specified.

GEO. GENSCH.

Witnesses:
ERNEST C. WEBB,
OTTO A. WEIDNER.